INVENTOR.
FRANK P. KOKESH
HIS ATTORNEY

Nov. 8, 1960 F. P. KOKESH 2,959,241
APPARATUS FOR INVESTIGATING EARTH FORMATIONS
Filed Dec. 8, 1955 4 Sheets-Sheet 3

INVENTOR.
FRANK P. KOKESH
BY Robert Hockfield
HIS ATTORNEY

INVENTOR.
FRANK P. KOKESH
BY Robert Hockfield
HIS ATTORNEY

United States Patent Office 2,959,241
Patented Nov. 8, 1960

2,959,241

APPARATUS FOR INVESTIGATING EARTH FORMATIONS

Frank P. Kokesh, Houston, Tex., assignor, by mesne assignments, to Schlumberger Well Surveying Corporation, Houston, Tex., a corporation of Texas Filed Dec. 8, 1955, Ser. No. 551,882

5 Claims. (Cl. 181—.5)

This invention relates to methods and apparatus for investigating earth formations and, more particularly, pertains to new and improved methods and apparatus for determining the seismic velocity of earth formations traversed by a well or borehole.

In seismic surveying, the occurrences of various reflections of acoustic energy from the detonation of an explosive charge are recorded. To interpret such a record, i.e., to obtain the actual depths of the reflecting interfaces, the velocity of seismic waves in the formations under investigation must be known.

Seismic velocity has been determined heretofore, for example, by lowering a seismometer or other type of transducer down a borehole, shooting one or more charges of explosive at the surface of the ground near the upper end of the borehole and recording the travel time of a wave from the explosion point to the seismometer for various depths. A curve is then prepared showing the average velocity from the surface to these depths.

While the foregoing procedure is generally satisfactory, it usually entails the presence of two crews of men, one for attending to the shots and making the recording, and another to lower the seismometer, and it is undesirably time-consuming. Consequently, this type of velocity survey is very costly.

It has also been proposed that seismic velocity be determined by lowering a device for generating seismic energy together with one or more transducers into a borehole. Although the travel time of seismic energy from the generator to the transducer may be measured, in these systems the spacing between the generator and the transducer is relatively short. For example, the spacing may be less than 100 feet or on the order of magnitude of ten times the diameter of the borehole. Obviously, by measuring the seismic velocity of the earth formations over such short distant intervals, velocity logs taken to depths of several thousand feet may be undesirably inaccurate because of cumulative errors.

It is, therefore, an object of the present invention to provide new and improved methods and apparatus for deriving a velocity log of earth formations traversed by a borehole with greater accuracy than heretofore possible.

Another object of the present invention is to provide new and improved methods and apparatus for determining the seismic velocity of earth formations traversed by a borehole at relatively low cost, yet affording highly effective and reliable results.

A further object of the present invention is to provide new and improved methods for investigating the seismic velocity characteristics of earth formations traversed by a borehole through a section in which casing has been set.

Yet another object of the present invention is to provide new and improved apparatus for determining the velocity of earth formations traversed by a borehole requiring less time than heretofore necessary in preparing the apparatus for introduction into the borehole and for removal therefrom.

In accordance with the present invention, a method for investigating earth formations traversed by a borehole comprises the steps of emitting wave energy at a first location in the borehole and intercepting wave energy at second and third locations in the borehole. The second location is spaced from the first location a first distance in a longitudinal direction, and the third location is spaced from the second location a second distance in a longitudinal direction. At least, the second distance is on an order of magnitude at least one hundred times greater than the diameter of the borehole. The arrivals of wave energy at the second and third locations are utilized to determine an acoustic property of the earth formations.

According to a specific aspect of the invention, one of the first and second distances is an integer multiple of the other. Increased accuracy may thus be afforded by employing at least one repeat interval wherein wave energy is emitted at a location in a zone including the aforesaid first and second locations and wave energy is intercepted at each of two locations spaced from the last-mentioned location and from one another by said first and said second distances, respectively. Thus, additional information concerning an acoustic property of the earth formations between the levels of the aforesaid second and third locations may be obtained.

To investigate earth formations traversed by a borehole in which casing has been set, in accordance with another aspect of the present invention, wave energy is emitted at one location below the lower end of the casing and wave energy is intercepted at at least one other location above the lower end of the casing.

According to another feature of the present invention a supporting cable adapted to be lowered into a well or borehole carries one or more transducers. At least one of the transducers is mounted to the cable by a releasable mechanical connection and is arranged to lie along the outer surface of the cable. Accordingly, the transducer may be readily attached to and removed from the cable to facilitate its insertion into and removal from the borehole.

The novel features of the present invention are set forth with particularity in the appended claims. The present invention, both as to its organization and manner of operation, together with further objects and advantages thereof, may best be understood by reference to the following description taken in connection with the accompanying drawings in which:

Figures 1, 4:
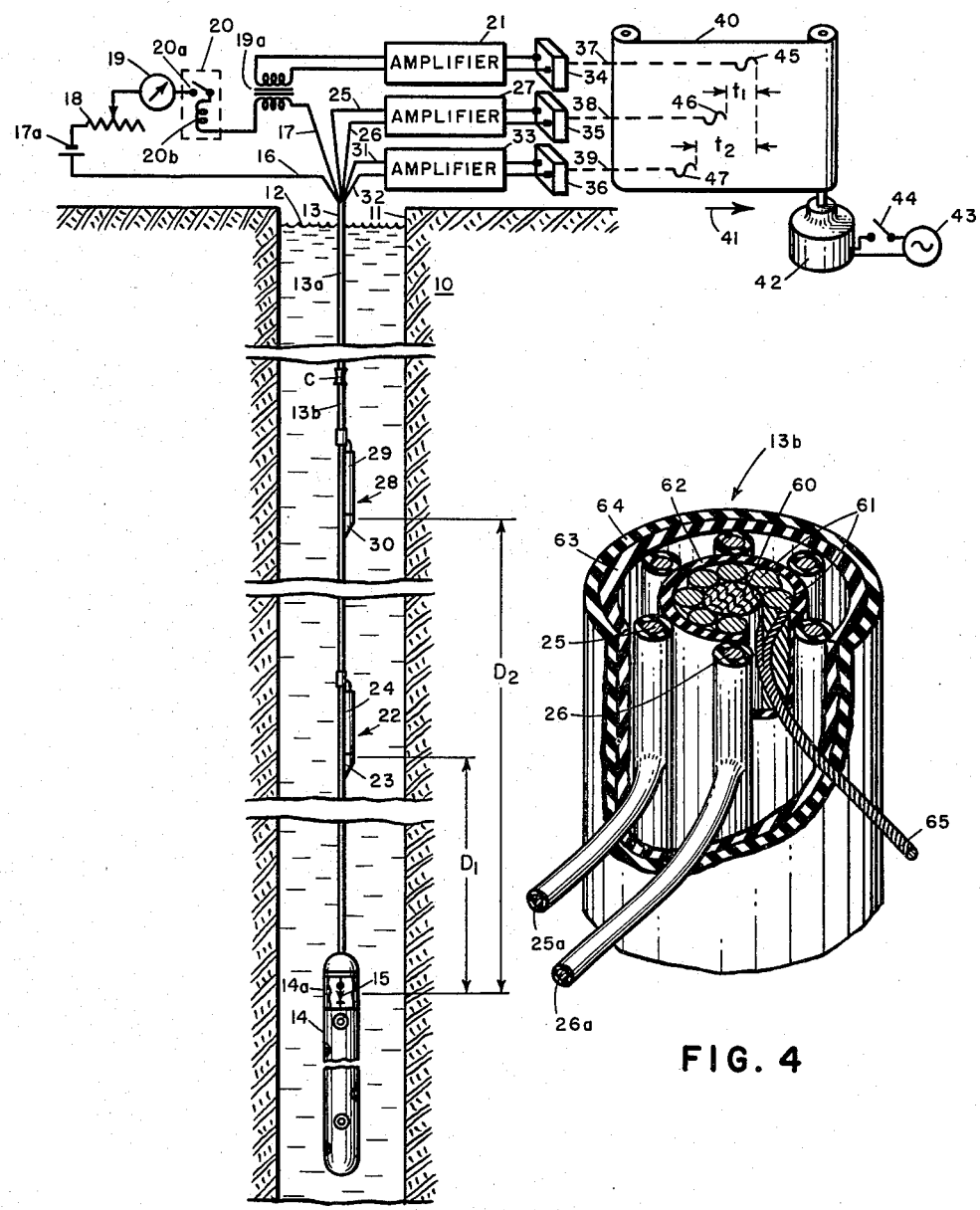
Fig. 1 is a schematic representation of a system for investigating earth formations traversed by a borehole embodying the present invention.
Fig. 4 is a perspective view of a section of the supporting cable for a transducer, portions thereof being broken away to reveal the details of the manner in which a transducer may be conveniently connected thereto.

In Fig. 1 of the drawings, apparatus embodying the present invention is shown as it may be employed to determine the seismic velocity of earth formations 10 traversed by a borehole 11. Borehole 11 contains a drilling liquid 12 which may be the usual water base or oil base mud.

The portion of the apparatus adapted to be lowered into the borehole 11 is carried by an electric cable including an upper section 13a which may be at least several thousand feet long associated with a conventional winch (not shown) at its upper end. It is mechanically and electrically coupled by means of an appropriate connector C to a low velocity, lower section 13b which may be in the neighborhood of one thousand feet long. The characteristics and construction of cable 13b will be described hereinafter.

Supported at the lower end of cable section 13b is a wave energy generator 14 which may be in the form of a conventional well casing perforator wherein a plurality of explosive charges may be selectively detonated thereby to impel respective projectiles toward the wall of borehole 11. Each of the resulting explosions creates an impulse of acoustic wave energy which is transmitted by drilling mud 12 into the earth formations 10 essentially simultaneously with the acoustic impulse produced by the impact of the associated projectile on the wall of the borehole. Of course, instead of a projectile, any form of object may be impelled toward the sidewall of the borehole. Alternatively, the arrangement may be such that an explosion is created without the expulsion of an object.

Perforator 14 may be provided with a firing circuit of the type described in a copending application of Marcel Schlumberger, filed November 19, 1949, and assigned Serial No. 128,386, now Patent No. 2,736,260, and including a concussion-operated normally-closed switch 15 disposed in an upper section 14a of device 14. Switch 15 is in series with one of a pair of insulated electrical conductors 16 and 17 that extend to the surface of the earth through cable 13a—13b. At the surface, these conductors are connected to a source of electrical energy, such as a battery 17a, through a variable resistor 18, an indicator 19 and an operating switch 20. The switch 20 includes normally open contacts 20a and a holding coil 20b which is energized when the switch is closed and which holds the switch closed until the circuit is subseqently opened. The primary winding of a transformer 19a is included in series with the firing circuit to develop a pulse each time a shot is fired, and the secondary winding of transformer 19a is coupled to an amplifier 21.

Attached to the side of cable section 13b above perforator 14 in a manner to be described in detail hereinafter is a cylindrical housing 22 having a lower transducer section 23 and an upper amplifier section 24. Transducer section 23 is spaced longitudinally along the borehole 11 a distance $D_1$ from upper portion 14a of wave energy generator 14. Distance $D_1$ may be on an order of magnitude at least one hundred times greater than the diameter of borehole 11.

Transducer section 23 houses a transducer which may be of any of various types for converting pressure changes or velocity changes, or both, to an electrical signal. Preferably, however, a conventional magnetostrictive device exhibiting good high frequency response is employed for converting sonic energy in pressure form into an electrical signal. Amplifier section 24 contains a conventional circuit arrangement for amplifying this signal so as to minimize the effects of cross-coupling of the cable conductors 16 and 17 carrying the shooting current to signal conductors 25 and 26. Preferably, the amplifier in section 24 should have the same gain for all signal frequency components in a range from 300 cycles per second (c.p.s.) to 3,000 c.p.s. Of course, a low frequency limit of the order of 20 cycles per second may be employed where cross-coupling effects can be neglected or minimized. The high frequency end of the range of operation for the amplifier in housing section 24 can be up to 5,000 c.p.s., the practical limit depending on the gain and space requirements for the amplifier. In any event, it is desirable that frequencies at least to 2,000 c.p.s. be translated. Amplified signals are supplied via cable conductors 25 and 26 to an amplifier 27 at the surface of the earth. Amplifier 27 should translate signals in the same frequency range as the amplifier in housing section 24.

Any known method for supplying electric power to the amplifier in housing section 24 may be employed. For example, appropriate batteries may be contained therein. Alternatively, electrical energy may be supplied via a pair of conductors of cable 13a—13b. These may be a separate pair, or signal conductors 25 and 26 may be utilized by means of a conventional multiplexing.

Another cylindrical housing 28 is supported at the side of cable section 13b above housing 22. It may be like housing 22, containing a similar amplifier in an upper section 29 and a transducer in a lower section 30 spaced longitudinally a distance $D_2$ from wave energy generator 14. Distance $D_2$ may be an integer multiple, such as two times, distance $D_1$. While any form of conventional transducer may be employed for good high frequency response, the transducer in housing section 30 may be a magnetostrictive device, like the one in housing section 23. The signal from the amplifier in housing section 29 is supplied via insulated conductors 31 and 32 of cable 13a—13b to an amplifier 33 at the surface of the earth.

The output circuits of the amplifiers 21, 27 and 33 are connected to respective galvanometers 34, 35 and 36 which may, for example, be of the light-reflecting or mirror type. Thus, the galvanometers reflect light from one or more sources (not shown) in respective beams 37, 38 and 39 toward a photosensitive recording paper 40. The galvanometers and recording paper may be contained with in a conventional light-tight enclosure and after exposure the paper is processed in a known manner to provide a permanent record. Recording medium 40 is displaced in a direction 41 perpendicular to deflective movement of the light beams 37–39 at a constant speed by a synchronous motor 42. The motor may be selectively connected to a source of alternating potential of fixed frequency 43 by an operating switch 44.

Of course, where very precise speed control of the recording medium is not desirable, a time base may be recorded during operation of the system. For example, timing lines may be impressed by means of a flasher lamp driven through an amplifier from a tuning fork of appropriate frequency. Alternatively, a synchronous motor may be employed to drive a rotating drum having one or more slits. The motor is powered from a source of alternating current of frequency determined by a tuning fork and light from a lamp is broken into spaced lines by the slit. While either of these arrangements might be preferred, for the sake of simplicity in representation, the present invention is described in association with a recorder having its recording medium driven at constant speed.

In operation, cable 13a—13b is lowered into borehole 11 and perforator 14 is positoned at a selected depth. Switch 44 is closed to energize motor 42 and recording medium 40 is displaced in the direction of arrow 41 at a constant speed. Immediately thereafter, switch 20 is closed and resistor 18 is manipulated until one of the shots in perforator 14 is detonated as indicated by a deflection on meter 19, and seismic energy passes into earth formations 10, traveling at a velocity to be determined by the method according to the present invention. At the same time, of course, a pulse is supplied via amplifier 21 to galvanometer 34 and beam 37 is deflected to produce an indication 45 denoting the time at which wave energy is emitted at a first location in borehole 11, usually referred to as a "time-break."

Wave energy is intercepted at a second location, that of the transducer in housing section 23, and an amplified pulse is supplied by the amplifier in housing section 24 to amplifier 27. Beam 38 of galvanometer 35 thus is deflected to provide an indication 46 displaced in time from "time-break" 45 by an interval, $t_1$.

As wave energy travels through formations 10, it arrives at the level of transducer section 30 denoting a third location and the resulting pulse developed by the transducer in section 30 is supplied by the amplifier in housing section 29 to amplifier 33. This pulse causes the light beam 39 from galvanometer 36 to be deflected and provide an indication 47 displaced in time from "time-break" 45 by an interval $t_2$.

Since the recording medium 40 is displaced at a constant speed, the distances $t_1$ and $t_2$ represent the travel time of seismic energy over the distances $D_1$ and $D_2$, respectively, through the earth formations under investigation. Accordingly, the arrivals of wave energy at the locations of the transducers in housing sections 22 and 28 may be utilized to determine an acoustic property (seismic velocity in this case) of the earth formations.

Figures 2, 3:
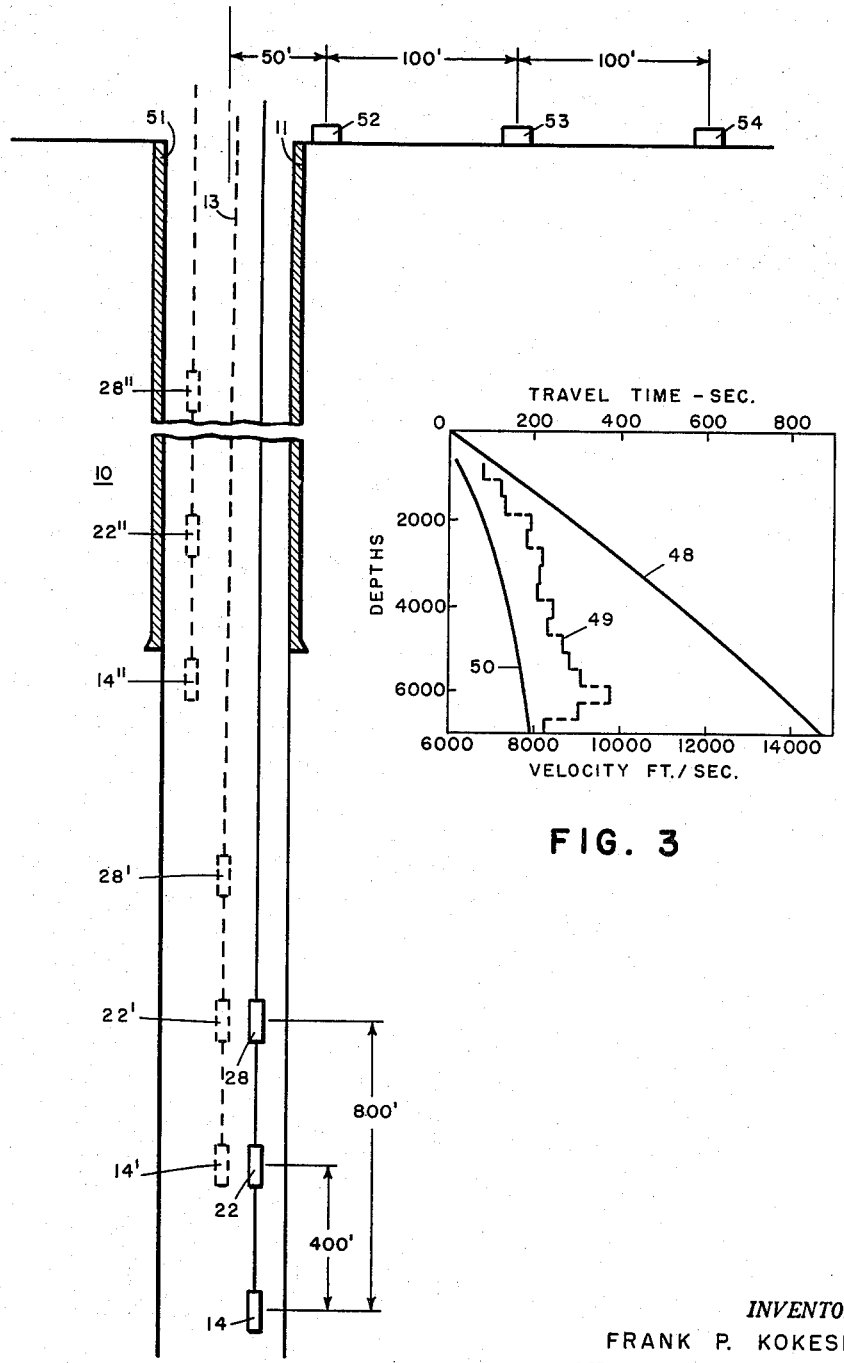
Fig. 2 is a simplified representation of the apparatus shown in Fig. 1 helpful in explaining the manner in which the method for investigating earth formations according to the present invention is carried out.
Fig. 3 illustrates a typical result which may be obtained through the use of the present invention.

The disposition of the borehole apparatus for the operating cycle just described is represented in full lines in the simplified illustration of Fig. 2 showing typical spacings for $D_1$ and $D_2$ of 400 feet and 800 feet, respectively. For the next cycle of operation cable 13 is raised to bring the perforator to a position designated 14' in the borehole formerly occupied by transducer housing 22. Thus, housing 22 is brought to a position 22' in which it occupies the former position of transducer housing 28 and the latter is at a new position 28'.

Driving motor 42 is energized to displace recording medium 40 at a constant speed and switch 20 and resistor 18 are operated so that another complete record of travel times is obtained. It is evident that because the transducer in section 30 of housing 28 is longitudinally spaced from perforator 14 a distance equal to twice the distance between the wave generator 14 and the transducer section 23 of housing 22, the travel time $t_2$ minus $t_1$ obtained in the first sequence of operation should be the same as the travel time $t_1$ obtained in the second sequence. By taking an average of these travel times, increased accuracy of results is afforded. Moreover, a substantial variation in corresponding travel times may be indicative of the presence of a fault or other anomaly thus providing additional information about the formation.

From the travel time noted for each of the successive locations along the borehole, a continuous record of travel time versus depth may be obtained and presented in the manner illustrated by curve 48 in Fig. 3. Moreover, in each interval for which travel time is obtained, the velocity may be calculated in a known manner and the interval velocity curve 49 of Fig. 3 may be also plotted. In addition, the average velocity may be computed in a known manner and presented in the manner shown by curve 50.

If desired, the travel time data may be corrected to take into account the variation from reference section 14a of perforator 14 at which a series of shots are made owing to the longitudinal spacing of the several explosive charges in the perforator. In prior systems, this may be inconsequential, however, highly accurate measurements may be made in the practice of the present invention. Such an order of magnitude of accuracy is achieved, in part, by using amplifiers and galvanometers having a response to a relatively high frequency (3,000 c.p.s.) in contrast to prior systems whose frequency response extends to about 100 c.p.s. In particular, the high frequency response of apparatus embodying the present invention permits a much more well defined and steeper wave front to be recorded. This is particularly important in view of the discovery that high frequencies are propagated over the measured intervals at depths of many thousands of feet. Therefore, increased accuracy may be obtained over an entire survey. If desired, filters may be employed to exclude frequencies below 100 c.p.s. and thereby minimize the effects of extraneous signals.

To obtain a "surface tie," i.e., to determine the travel time from the surface of the earth to a depth below the lower end of well casing 51 (Fig. 2) geophones may be located at the surface at locations 52, 53 and 54. For example, location 52 may be spaced fifty feet from the axis of the borehole 11, location 53 is one hundred feet from location 52 and location 54 is one hundred feet from location 53. By firing perforator 14 at a point below the casing 51, the required velocity information may be recorded.

Of course, any other arrangement may be employed wherein a geophone is lowered into a shot hole adjacent the borehole 11 or wherein an explosive is detonated at the surface or in a shot hole and the resulting impulse of energy received by a geophone supported immediately below the lower end of casing 51. Thus, by using the one of these methods best suited to the particular application the data for completing the portion of the record in Fig. 3 representing the travel times and acoustic velocities to a distance within several hundred feet of the surface of the ground can be derived.

It may be desirable to utilize energy propogation at low frequencies in obtaining a "datum tie." To this end, one of the transducer housings, such as the one designated 23 in Fig. 1, may additionally contain a conventional velocity-type geophone capable of responding to frequencies down to 20 c.p.s. Although the amplifier in housing 24 may be used in both functions, preferably an appropriate relay is provided so that the amplifier may be selectively by-passed during the determination of the "datum tie"; i.e., the velocity geophone is coupled directly to cable conductors 25 and 26.

It has been discovered that seismic velocity of formations adjacent casing 51 may be obtained by positioning the source of seismic energy at the position designated 14″ just below the lower end of the casing. Accordingly, the transducers are spaced at respective distances of 400 and 800 feet above the perforator and are at the positions designated 22″ and 28″ within the casing.

When the perforator is actuated and a burst of seismic energy is transmitted into the formations 10, energy travels through the formations and through the portions of the casing 51 adjacent the transducers at positions 22″ and 28″. From the arrivals of energy at the transducers, travel times and seismic velocities can be obtained. Information obtained in this way has been found to agree very closely to the data for the same formations where no casing is present. This information is helpful in providing a "surface tie" or "datum tie" for the portions of the records below the casing.

A "datum tie" provides a reference level generally below the so-called weathered zone and thus the datum plane may be several hundred feet below the surface of the earth. For this reason it may be convenient to locate one of the positions 22″ or 28″ at the datum level. Alternatively, another geophone may be lowered from the surface to that level. In either case, a recording may be made from a shot below casing 51 if the casing shoe is not too far below the datum. In this way, all measurements are confined to borehole 11 and surface geophones are not required.

From the foregoing discussion it is apparent that the method of investigating earth formations in accordance with the present invention provides velocity information with greater accuracy than heretofore possible. Moreover, since the source as well as the receivers of seismic energy are lowered on a single cable, the required information may be obtained at a relatively low cost yet the results are highly effective and reliable.

Of course, while distances or spacings $D_1$ and $D_2$ of 400 feet and 800 feet have been illustratively specified, any of a variety of spacings may be used, such as 500 feet and 1,000 feet or 300 feet and 900 feet.

In the latter case, to obtain repeat intervals, a record is made at 300 foot intervals and the travel time $t_2$ minus $t_1$ of a first run should be equal to the sum of the travel times $t_1$ of each of second and third runs. Alternatively, $D_1$ may be 200 feet and $D_2$ may be 300 feet; $t_2$ minus $t_1$ for a first run plus $t_2$ minus $t_1$ for a second run should be equal to $t_1$ for a third run. It is thus evident that in each of these cases two measurements for a given interval may be compared for accuracy. While the considerations have been given for logging by making successive runs going in an upwardly direction, the considerations for downward runs will be obvious from the foregoing discussion.

Stated generally, for effecting repeat intervals, one of the transducers should be spaced from the source of acoustic energy at a first distance and the remaining transducer should be spaced from the one transducer a second distance where one of the first and second distances is an integer multiple of the other. Furthermore, measurements should be made at successive locations spaced from one another by the smaller of the first and second distances.

Where repeat intervals are not required, velocity may be determined from $t_2$ minus $t_1$. For example, the first distance may be 100 feet and the second distance may be 400 feet.

In any of the foregoing cases, the smaller of the distances may be as small as 100 feet and, in general, should be on an order of magnitude 100 times greater than the borehole diameter. The upper limit for the larger of these distances obviously depends on the transmission characteristics of the formations to be investigated. This can be determined experimentally.

Figure 5:
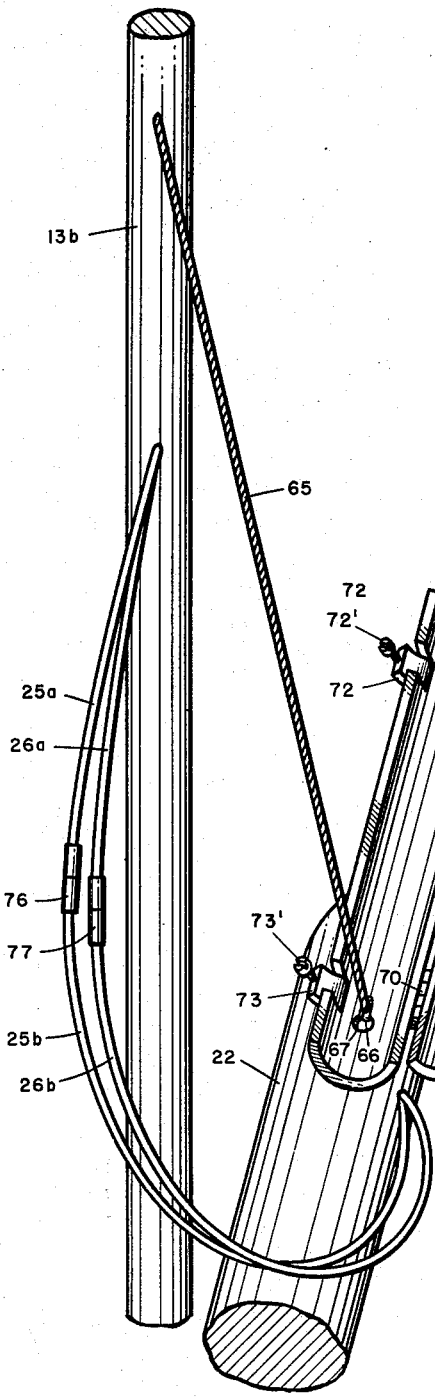
Fig. 5 is a perspective view of a portion of a sidemounted transducer support shown prior to operative association with a supporting cable.
Figure 6:
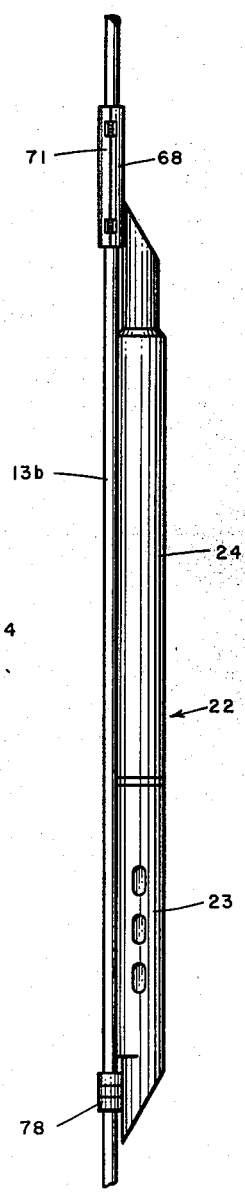
Fig. 6 represents the transducer support shown in Fig. 5, but illustrated in operative relation with the supporting cable.

Figs. 4-6 illustrate the manner in which cable section 13b and the transducer housings may be constructed to facilitate attachment and detachment. As shown in Fig. 4, cable 13b is comprised of a central core 60 composed, for example, of hemp. A plurality of stranded steel, load-carrying wires 61 are spaced about core 60 and, in turn, are encased by a rubber sleeve 62. Distributed about sleeve 62 are a plurality of electrical conductors such as the one designated 25, 26 in Fig. 1. These conductors are individually enclosed by insulating sleeves composed, for example, of rubber. The electrical conductors are encased by an outer rubber sleeve 63, in turn, surrounded by an abrasion-resistant sleeve 64, constructed for example, of neoprene. The portions of the cable just described apart from hemp core 60 may be of conventional construction.

The use of hemp core 60 gives the cable a low velocity characteristic. For example, the velocity at which seismic energy is propagated through the cable may be less than 5500 feet per second. On the other hand, the velocity of seismic energy traveling through the earth formations may be in the neighborhood of 6,000–25,000 feet per second. Formation energy thus arrives at the various transducers ahead of the cable energy and the possibility of confusion between these two energy paths in the recorded signal is minimized. Accordingly, more accurate determinations of acoustic velocity may be made than theretofore possible.

Electrical connections to the amplifiers of the transducer units may be made by extending leads from the connector C that electrically and mechanically connects cable section 13a with the low velocity section 13b. However, for the sake of simplicity in representation, extensions 25a and 26a are provided for the conductors 25 and 26 in Fig. 4. The conductors 25a and 26a as well as their junctions with the conductors 25 and 26 are electrically insulated.

A flexible load-supporting cable 65 constructed of stranded steel wires is physically connected to one or more of the load-carrying elements 61 and, as shown in Fig. 5, its free end is provided with a ball 66 received by a slot 67 in a semicylindrical latch portion 68 that extends upwardly from housing 22. Hinges 69 and 70 connect latch portion 68 with a complimentary latch portion 71 of semicylindrical configuration. Recessed fasteners 72 and 73 are provided at respective points of latch portion 68 opposite the hinges 69 and 70 and are positioned to enter slots 74 and 75 in latch portion 71 when it is rotated toward the portion 68 to form a cylindrical enclosure for the cable 13b. Screws 72' and 73' are threaded into the fasteners 72 and 73, respectively, and are arranged to secure the fasteners.

The free ends of conductors 25a and 26a are appropriately treated to make electrical connections with the free ends of conductors 25b, 26b by means of conventional electrically insulated connectors 76 and 77. Preferably, the connectors 76 and 77 are arranged so that connections may be quickly and easily made and broken. When connectors 76 and 77 complete electrical connections between the respective conductors, each forms a fluid-tight seal about the junction it makes. The conductors 25b, 26b extend through sealed openings in housing 22 to make electrical connections with the output circuit of the amplifier contained therein.

In the use of the construction just described, perforator 14 is lowered into the borehole and as the portion of cable 13b including the conductors 25a, 26a and cable 65 approaches the rotary table (not shown), downward movement is stopped for a short time. Housing 22 is brought close to the cable 13b and the ball 68 is inserted into slot 67. The free ends of the connectors 76 and 77 are brought together to complete the electrical connections between conductors 25a and 25b and conductors 26a and 26b. Thus, the condition represented in Fig. 5 is obtained.

Thereafter, latch portion 68 is brought into engagement with the body of cable 13b with load-supporting member 65 in the space between the cable and the latch portion, and latch portion 71 is rotated to form an enclosure about the cable as shown in Fig. 6. Fasteners 72 and 73 then may be pivoted into the slots 74 and 75 and the screws 72' and 73' tightened, effectively to clamp the fasteners in place. Finally, the lower end of housing 22 is secured to cable 13b by an appropriate latch 78 that is fixed to the housing. Of course, the lower end may be held in any appropriate manner providing speed and efficiency of operation.

The cable is then lowered to a position at which the housing 28 may be attached in the same manner described in connection with housing 22. Thereafter, the cable is lowered so that a velocity survey may be run in the manner described hereinbefore.

On bringing the equipment out of the borehole 11, housing 28 is removed in the manner to be described in connection with housing 22. After housing 22 is brought to the surface, it may be quickly and conveniently removed from the cable. This is accomplished by first opening latch 78, loosening screws 72' and 73' and pivoting the fasteners 72 and 73 so as to permit the latch section 71 to be rotated. Thereafter, the component parts of connectors 76 and 77 may be separated and ball 66 can be taken from slot 67.

From the foregoing description it is obvious that by mounting the transducers to the side of the supporting cable, the time required for the borehole apparatus to be made up for a velocity survey and for disassembling it is considerably shorter than in prior arrangements wherein the transducers are connected at their ends to the supporting cable. Of course, after the side-mounted housings have been removed, cable 13a—13b with its mechanical and electrical take-outs can be passed over the usual sheave wheels and reeled onto a winch drum in the conventional manner.

Figures 7, 8:
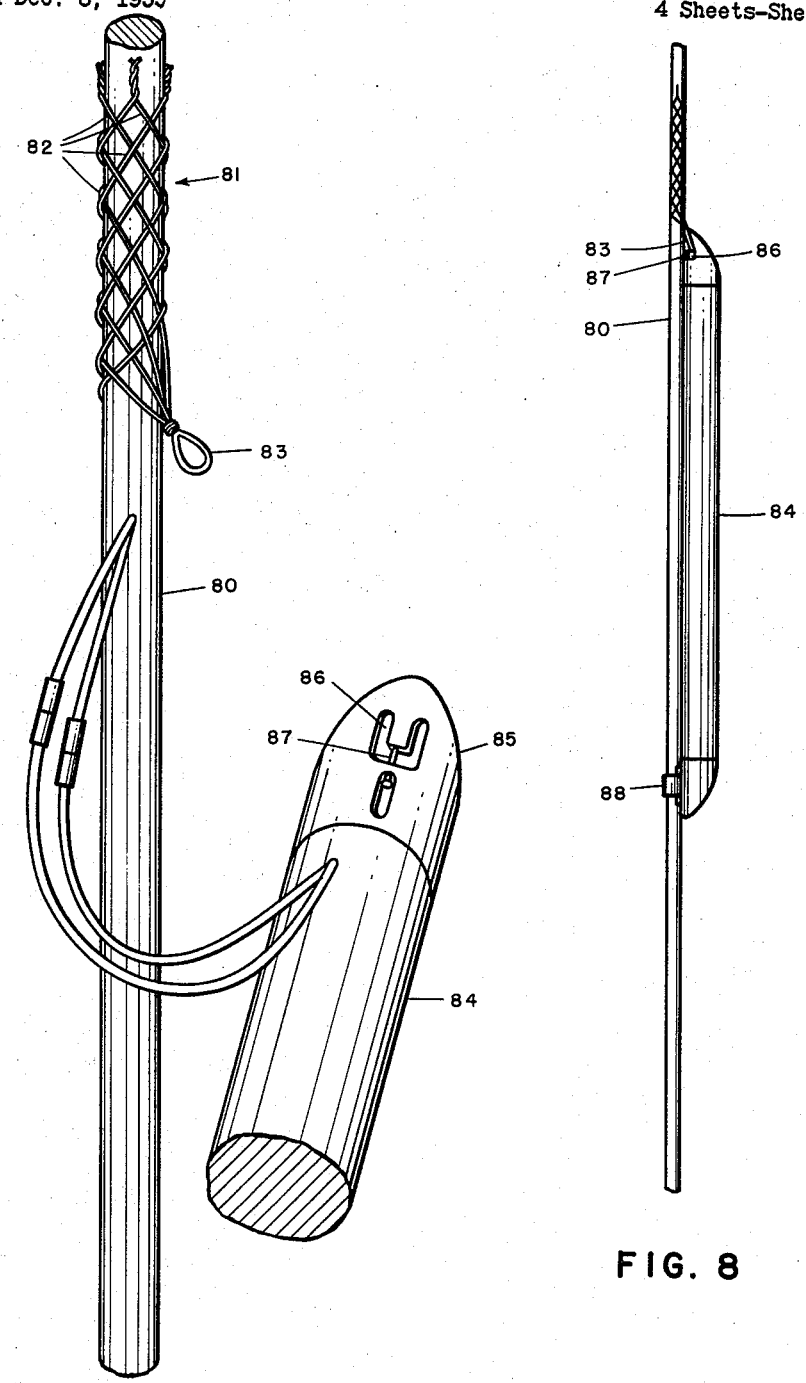
Figs. 7 and 8 are views similar to the ones represented in Figs. 5 and 6, but illustrating another type of sidemounted transducer support.

An alternative organization of elements for side-mounting a transducer housing is shown in Fig. 7. An electric, low velocity cable 80 similar to the one shown in Fig. 4 is employed, however, cable 65 is not utilized. Instead, disposed along the outside surface of cable 80 is a cable grip 81 comprised of a plurality of interwoven steel strands 82 arranged in a known manner so that a longitudinal force on the grip causes it to contract on cable 80. The upper ends of the strands 82 may be terminated in any appropriate manner and the lower ends are formed into a loop 83. Transducer housing 84 is provided with an upper end 85 having a slot 86 defining a hook-like member. A spring-biased latch 87 extends across a portion of slot 86.

As seen in Fig. 8, the transducer housing 84 may be easily attached to cable 80 by passing loop 83 into the hook formed by slot 86; latch 87 prevents accidental removal of the loop during operation. As in the arrangement of Figs. 5 and 6, a latch 88 connected to the lower end of housing 84 releasably grasps the cable 80, and a similar manner of completing electrical connections is employed. Obviously, the transducer housing 84 may be conveniently and easily removed from cable 80 when necessary.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Apparatus for supporting a transducer in seismic investigation from a cable to be suspended in a well comprising a housing having a tranducer encased therein, supporting means operatively connected to an outside portion of said housing, said supporting means comprising a separable clamping latch whereby said housing may be releasably clamped to a cable for lowering into a well.

2. Apparatus for supporting a transducer in seismic investigation from a cable to be suspended in a well as in claim 1 wherein said separable clamping latch includes a plurality of latch portions, and means to fasten said latch portions together.

3. Apparatus for supporting a transducer in seismic investigation from a cable to be suspended in a well as in claim 1 wherein said apparatus further includes load-supporting cable means attached to the cable to be suspended in a well, and means formed on said housing adapted to releasably couple with said load-supporting cable means.

4. Apparatus for supporting a transducer in seismic investigation from a cable to be suspended in a well as in claim 1 wherein said apparatus further includes load-supporting cable means attached to the cable to be suspended in a well, said load-supporting cable means having an enlarged portion formed thereon, and slot means formed on said housing adapted to receive said enlarged portion of said load-supporting cable means.

5. Apparatus for supporting a transducer in seismic investigation from a cable to be suspended in a well as in claim 1 wherein said apparatus further includes cable grip means adapted to be attached to the cable to be suspended in a well, said cable grip means having a loop portion formed thereon, and hook means formed on said housing adapted to couple with said loop portion of said cable grip means.

References Cited in the file of this patent

UNITED STATES PATENTS

| | | |
|---|---|---|
| 527,529 | Leber | Oct. 16, 1894 |
| 1,375,270 | Anderson | Apr. 19, 1921 |
| 2,075,206 | Kantack | Mar. 30, 1937 |
| 2,191,121 | Slichter | Feb. 20, 1940 |
| 2,233,992 | Wyckoff | Mar. 4, 1941 |
| 2,301,458 | Salvatori | Nov. 10, 1942 |
| 2,398,013 | Kyle | Apr. 9, 1946 |
| 2,608,162 | Woodruff | Aug. 26, 1952 |
| 2,651,027 | Vogel | Sept. 1, 1953 |
| 2,771,960 | Smith | Nov. 27, 1956 |
| 2,813,590 | McDonald | Nov. 19, 1957 |